United States Patent [19]

Baker

[11] Patent Number: 5,031,392
[45] Date of Patent: Jul. 16, 1991

[54] ELEVATOR ASSEMBLY AND SLEWING MECHANISM FOR CANE HARVESTER

[75] Inventor: Malcolm J. Baker, Bundaberg, Australia

[73] Assignee: Austoft Industries Limited, Bundaberg, Australia

[21] Appl. No.: 526,107

[22] Filed: May 18, 1990

Related U.S. Application Data

[60] Division of Ser. No. 765,306, Aug. 13, 1985, abandoned, which is a continuation-in-part of Ser. No. 423,262, Sep. 24, 1982, Pat. No. 4,555,896.

[30] Foreign Application Priority Data

| Nov. 20, 1981 | [AU] | Australia | PF-1633 |
| Aug. 14, 1984 | [AU] | Australia | PG-6559 |
| Aug. 14, 1984 | [AU] | Australia | PG-6560 |
| Aug. 14, 1984 | [AU] | Australia | PG-6561 |
| Aug. 14, 1984 | [AU] | Australia | PG-6562 |

[51] Int. Cl.$^5$ .................................................. A01D 45/10
[52] U.S. Cl. ....................................... 56/013.9; 56/14.5; 460/59; 460/123
[58] Field of Search .................... 460/59, 97, 123; 56/13.9, 14.5, 14.3

[56] References Cited

U.S. PATENT DOCUMENTS

| 3,122,850 | 3/1962 | Rockwell | 37/44 |
| 3,363,711 | 1/1969 | Knell et al. | 180/79.2 |
| 3,530,650 | 9/1970 | Phillips | 56/14.3 |
| 3,603,424 | 9/1971 | Blood et al. | 180/79.2 B |
| 3,952,825 | 4/1976 | Beyers | 180/139 |
| 4,381,827 | 5/1983 | Blackmore et al. | 180/139 |
| 4,677,813 | 7/1987 | Stiff et al. | 56/13.9 |

OTHER PUBLICATIONS

Diagram-Toft 6000 (date unknown).
Diagram-MF102 Aug. 1977.

Primary Examiner—Terry Lee Melius
Attorney, Agent, or Firm—Weil, Gotshal & Manges

[57] ABSTRACT

There is provided an improved elevator control and slewing mechanism for a cane harvester including a bracket pivotally mounted to the harvester frame for rotation about a first vertical axis to which the elevator is mounted, a pair of slew control arms each of which includes two links which are pivotally joined to one another to form an elbow joint rotatable about a second vertical axis and means to pivotally couple one of the links of each pair to the harvester frame and the other one of each pair to the bracket and means for slewing the elevator about the first vertical axis.

3 Claims, 9 Drawing Sheets

ELEVATOR ASSEMBLY AND SLEWING MECHANISM FOR CANE HARVESTER

This is a divisional of copending application Ser. No. 06/765,306 filed on Aug. 13, 1985 now abandoned, which is a continuation in part of U.S. application Ser. No. 06/423,262 filed on 9-24-82, now U.S. Pat. No. 4,555,896.

INTRODUCTION

This application relates to the main frame of a cane harvester and, more particularly, to the main frame of a harvester which utilizes the fuel and hydraulic liquid carrying tanks as load carrying members of the harvester.

This application further relates to a chopper roll assembly and, more particularly, to the chopper drum of a chopper roll assembly which is more conveniently removed from a cane harvester.

This application further relates to an elevator and, more particularly, to an elevator used on a cane harvester which may be lowered from its operating position to a lower position used for servicing and transport.

This application further relates to a low profile basecutter assembly and, more particularly, to a low profile basecutter assembly which may be utilized in association with large capacity cane harvesters.

BACKGROUND OF THE INVENTION

In cane harvesters, it is important to have structural rigidity in the area of the chopper drums. This is so because the knives of the chopper drums are in close proximity throughout their longitudinal length which extends across substantially the transverse distance between the frame sections. Failure to provide this structural rigidity can cause damage to the knives and chopper drums and can cause uneven billet cutting.

Further, since the chopper drums are located in the rearward portion of the harvester, they were subject to the considerable loading effects caused by the elevator. In adjacent row cutting harvesters, these loads are considerable.

Previously, structural reinforcement steel was provided to obtain frame integrity. This was unsatisfactory because it was expensive and added unwanted weight to the harvester.

A further problem in the structure of harvesters occurs in the forward crop gathering area. In this area, the harvester necessarily must have a hollow area between the frame sections to allow crop to pass therethrough to the basecutters. Because the height of cane is significant, this hollow area can extend upwardly a good distance thus adversely affecting the structural rigidity of the frame. Previously, structural steel was also used in this area to provide structural integrity. As stated, such use is expensive and increases the weight of the harvester.

Yet a further problem occurred in the area of the engine compartment mounting. Previously, the engine was located at an elevated position on the harvester and it was desirable, for stability purposes, to lower the engine. Lowering the engine, however, required a substantial reduction in the height of the frame sections supporting the engine which, again, adversely affected the load carrying ability of the frame sections.

Chopper drums on cane harvesters cut the cane passing through the harvester into billets which are used in the sugar cane milling and refining process. This cutting subjects the chopper drums to severe shock loads because of differences in the quantity of crop passing between the knives of the chopper drums and because of the existence of rocks and other debris which have not been disposed of before arriving at the chopper drums.

Previous chopper drums included a solid shaft extending from each end of the chopper drum. The shaft was mounted in bearing housings in the frame of each side of the harvester. External to the bearings on one side, a splined adaptor plate was attached to the end of the chopper drum which provided the timing and the drive to the chopper drum.

In the event of damage to the chopper drum, the splined shaft or the internally splined adaptor plate, the entire assembly had to be replaced which was expensive. Further, it was necessary to remove the entire assembly through the frame which was time consuming and unnecessary.

Cane harvesters have evolved from low capacity machines used for intermittent cane cutting at infrequent intervals to high capacity machines which are intended to be used 24 hours per day in various locations. As such, the ease of servicing harvesters and their transport to various locations becomes of considerable importance.

Previously, the elevators of harvesters would be removed for transport where overhead instructions such as wires or overpasses were present. This was required because the cleaning chamber design of such harvesters did not permit the elevators to be raised or lowered except for a very limited amount of movement. Removal and refitting of the elevators was time consuming and complicated and required the service of a crane. It was also unnecessary.

Further, to service the higher areas of the elevator, the operator would have to climb up the elevator. This was inconvenient and dangerous.

It is necessary, particularly for cane harvesters used in harvesting green cane; that is, cane that has not been burned prior to harvesting, that the throat area through which the cut cane passes be as wide and as unobstructed as possible. This is so because of the large amount of crop material that must pass through the throat and be cut by the basecutters. A large throat area will increase capacity as will the removal of obstructions therein.

The width of the throat, however, is restricted by the cane cutting capabilities of the machine itself. While it is possible to increase throat size, that size is limited if it is desired to have a machine which is capable of cutting adjacent rows of cane in either direction. It is known, for example, to use a large throat area in certain harvesters. Such harvesters are restricted, however, to 'perimeter cutting'; that is, such harvesters cannot cut adjacent rows in either direction. Rather, such harvesters are restricted to cutting around the perimeter of the cane field with ever increasing or decreasing distances between rows to be cut depending on how the operator operates his harvester. Such a practice is inefficient and results in unacceptable unused or 'down' time for such harvesters. Thus, throat size is, in practice, limited in transverse width.

When utilizing harvesters for adjacent row cane cutting it is also desirable to locate the severing area of the basecutters as close as possible to an imaginary line joining the forward harvester tires where the tires contact the ground surface. This is so because the basecutters will then follow the ground contour more closely and sever the cane very close to the cutting level selected by the operator thus avoiding wastage of cane or damage to the basecutters. If the basecutters are located forwardly or rearwardly of such an imaginary line, a "cantilever" or bridging effect is obtained which can make the basecutters vulnerable to damage from inadvertent contact with the ground surface or, as explained, increase the distance from the ground at which the cane is severed.

Previous adjacent row cutting harvesters utilized a gearbox located above the basecutters and connected thereto by drive shafts, one for each basecutter, extending downwardly from the gearbox. These drive shafts and the gearbox caused throat obstructions which, while causing no appreciable capacity difficulties when cutting burned cane, lessened that capacity when cutting green cane. The shafts were also subject to damage when forces from unusually large rocks were encountered because of the length of these drive shafts from the gearbox to the basecutters.

Basecutters of a smaller rather than a larger diameter are also desirable. This is so because the side profile of basecutter discs is desirably slanted from front to back in order to cut near the ground level. With basecutter discs of larger diameter, the cutting area of the basecutters is located substantially behind the forward most point of the basecutters and, therefore, at a higher distance above the ground level than is necessary. When the cane is knocked down by the top power roller during harvesting and particularly when cutting burned cane, the cane may escape beneath the basecutters without being cut. This is obviously undesirable.

Top rollers are used in cane harvesters to separate the cane stalks and to knock down the cane as the machine proceeds during its cutting operation. Fins are used on the top roller to separate the cane which enhances the cane cutting and the conveying of the cut cane in the feed passage to the chopper rolls. When cutting green cane, the amount of material may cause the top roller to become fouled with crop material. To remove this material, the top roller may be reversed.

The profile on the fins of previous top rollers, however, caused additional material jamming because the rearward surface of the fins contained a concave surface.

SUMMARY OF THE INVENTION

According to one aspect of the present invention, there is disclosed a cane harvester comprising two oppositely located frame sections and liquid carrying tank means mounted between said frame sections, and connected thereto, said liquid carrying tank means being operable to carry a significant structural load on said harvester.

According to a further aspect of the invention, there is disclosed a cane harvester comprising two oppositely located frame sections and an engine compartment housing mounted relatively low on said harvester and extending transversely between said frame sections and connected thereto, said engine compartment housing being operable to carry a significant structural load on said harvester.

According to a further aspect of the invention, there is disclosed a chopper roll assembly comprising a chopper drum extending transversely between two oppositely located frame sections, a drive stub mounted to one side of said chopper drum about its longitudinal axis, said drive stub being mounted within a hub bearing housing mounted to one of said frame sections, a timing stub mounted to the opposite side of said chopper drum about its longitudinal axis, said timing stub being mounted within a timing stub bearing housing, said timing stub bearing housing being mounted to the other of said frame sections, said drive stub and said timing stub being removably connected to said chopper drum.

According to a further aspect of the invention, there is disclosed a cane harvester comprising an annular cleaning chamber, an elevator having an elevator bowl located below said cleaning chamber, hydraulic cylinder control means to raise and lower said elevator between an operating and transport position, a safety rod means adjacent each of said hydraulic cylinder means with stop means defining said operating and transport positions and elevator support means below said elevator having a pivot axis extending transverse to the longitudinal axis of said harvester, said elevator support means being operable to allow said elevator to be lowered from said operating to said transport position.

According to a further aspect of the invention, there is disclosed a basecutter assembly for a cane harvester comprising a pair of basecutters, a gearbox operable to drive said basecutters, and motor means operable to provide power to said gearbox, said gearbox being located beneath said basecutters.

According to yet a further aspect of the present invention, there is disclosed a top roller for a cane harvester comprising a cylindrical inner portion, wear strips extending outwardly from the surface of said cylindrical inner portion and laterally across said cylindrical inner position and a series of fins mounted symmetrically about said wear strips and extending transverse to the axis of said top roller from said inner cylindrical surface, the side profile of said fins being a general convex radial surface on leading and trailing surfaces.

BRIEF DESCRIPTION OF THE SEVERAL VIEWS OF THE DRAWINGS

Embodiments of the invention will now be described, by way of example only, with the use of drawings in which.

DESCRIPTION OF SPECIFIC EMBODIMENT

Figure 1:
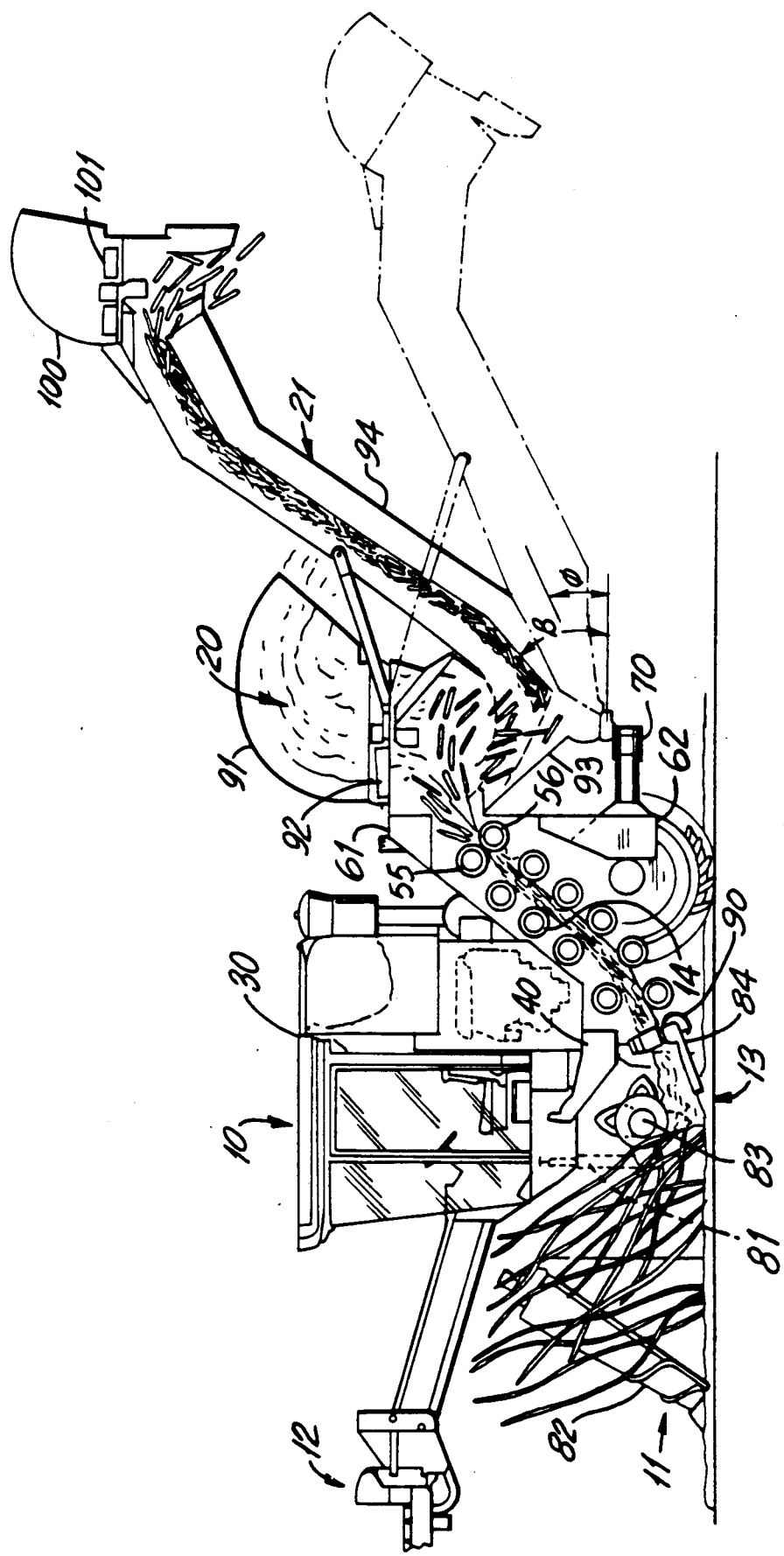
FIG. 1 is a diagrammatic side view of a cane harvester according to the invention.

A cane harvester is generally shown at 10 in FIG. 1. It comprises a crop dividing and gathering area generally shown at 11, a topper area generally shown at 12, a basecutting area generally shown at 13, a crop feeding area generally shown at 14, a cleaning area generally shown at 20 and a crop conveying and elevating area generally shown at 21.

Figure 2:
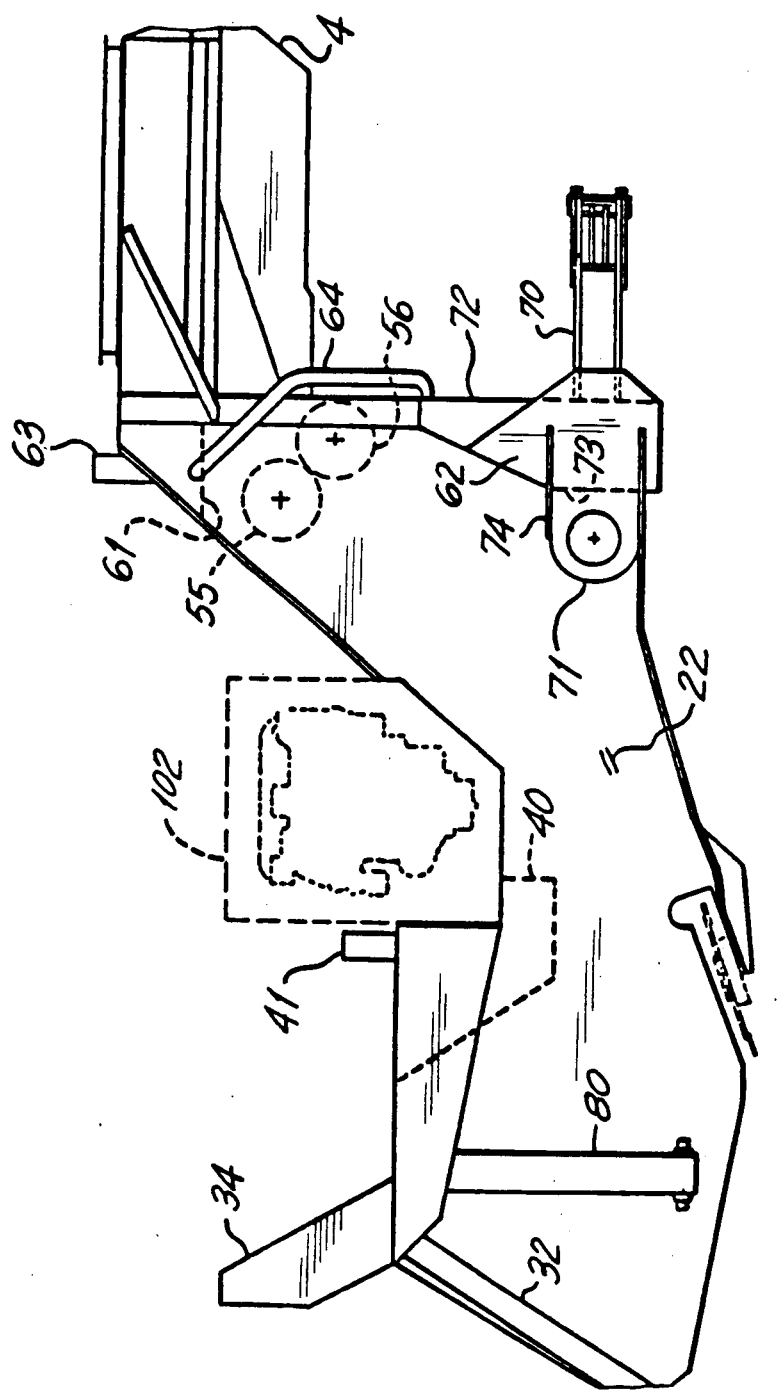
FIG. 2 is a side view of the frame of the cane harvester of FIG. 1 in partially assembled condition.
Figure 3:
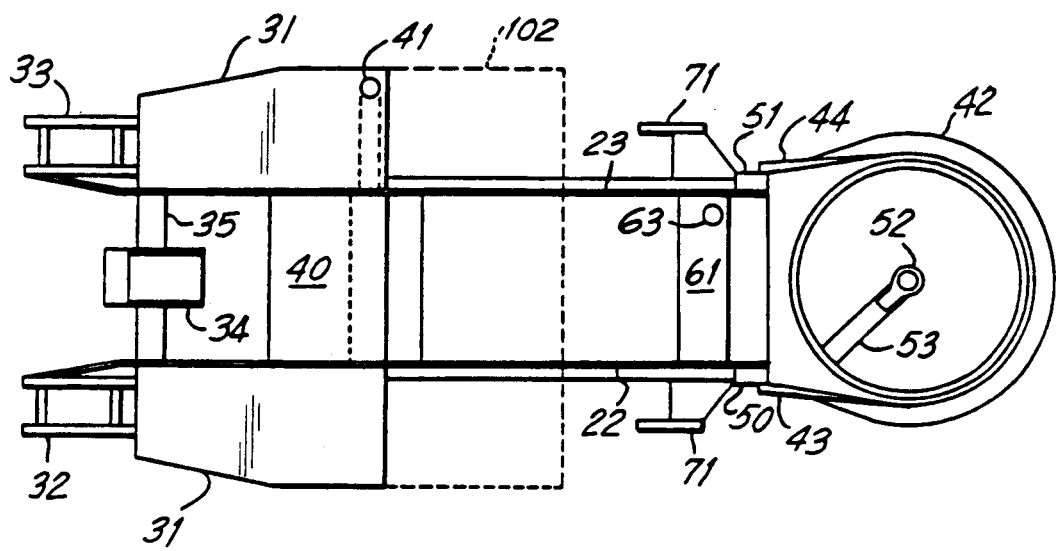
FIG. 3 is a plan view of the frame of FIG. 2.
Figure 4:
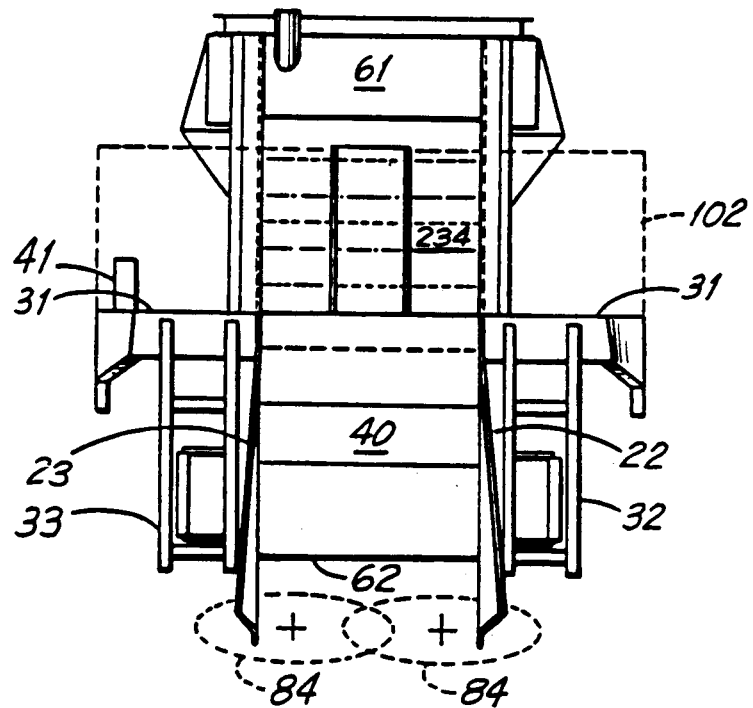
FIG. 4 is a front view of the partially assembled frame of FIGS. 2 and 3.

The harvester 10 is constructed using as a main frame two oppositely located frame sections 22, 23 as seen in FIGS. 2, 3 and 4. The frame sections 22, 23 have three liquid carrying tanks 40, 61, 62 mounted therebetween which provide the fuel and hydraulic fluid carrying capabilities for the cane harvester 10. Liquid carrying tank 40 is a fuel tank while liquid carrying tanks 61, 62 and hydraulic fluid tanks. All are connected to the frame sections 22, 23 by welding.

An operator's cab 30 has a platform 31 mounted to each frame section 22, 23 which is provided for the operator when he steps outwardly from the operator's cab. A fill pipe 41 extends from the operator's platform 31 to the fuel tank 40. Crop divider mounting arms 32, 33 are mounted to the frame sections 22, 23 and a topper mounting support 34 in connected to cross-member 35 and extends upwardly herefrom as best illustrated in FIG. 2.

At the rearward area of the harvester 10, the air intake baffle 42 of the cleaning chamber is attached to the frame sections 22, 23 by welding reinforcement members 43, 44 between the air intake baffle 42 and the reinforcement brackets 40, 51 mounted to the frame sections 22, 23. The fan supporting bracket 52 and fan supporting arm 53 extend outwardly from and are supported by the inside of the air intake baffle 42.

The chopper drums 55, 56 shown in FIG. 1 and in FIG. 2 in outline form, are mounted between the frame sections 22, 23. They extend transversely substantially the distance between the frame sections 22, 23.

Hydraulic fluid tanks 61, 62 are located, respectively, above and below and adjacent to the chopper drums 55, 56. They are mounted transversely between the frame sections 22, 23 and carry a significant structural load between the frame sections 22, 23 acting on the harvester 10. A fill spout 63 extends upwardly from the higher hydraulic fluid tank 61 and a commutation tube 64 extends from the higher hydraulic fluid tank 61 to the lower hydraulic fluid tank 62. The fluid tanks are connected between the frame sections by welding.

A hitch member 70 is mounted on the rearward surface 72 of the lower hydraulic fluid tank 62. Wheel mounting brackets 71 are supported by the forward surface 73 of the hydraulic fluid tank 62 (FIG. 3). Reinforcement brackets 74 are welded between the side surface of lower hydraulic fluid tank 72 and wheel mounting brackets 71.

An engine compartment 102 is mounted between the frame sections 22, 23 as illustrated in FIGS. 2, 3 and 4 and is welded to the frame sections 22, 23.

Vertical reinforcement brackets 80 (only one of which is shown) are mounted one to each frame section 22, 23. Each bracket, 80 is used to provide structural support for the vertical telescoping hydraulic cylinders 81 partially shown in outline in FIG. 1 which control the height of the harvester 10 and, therefore, the distance of the basecutters 84 from the ground.

Figure 5:
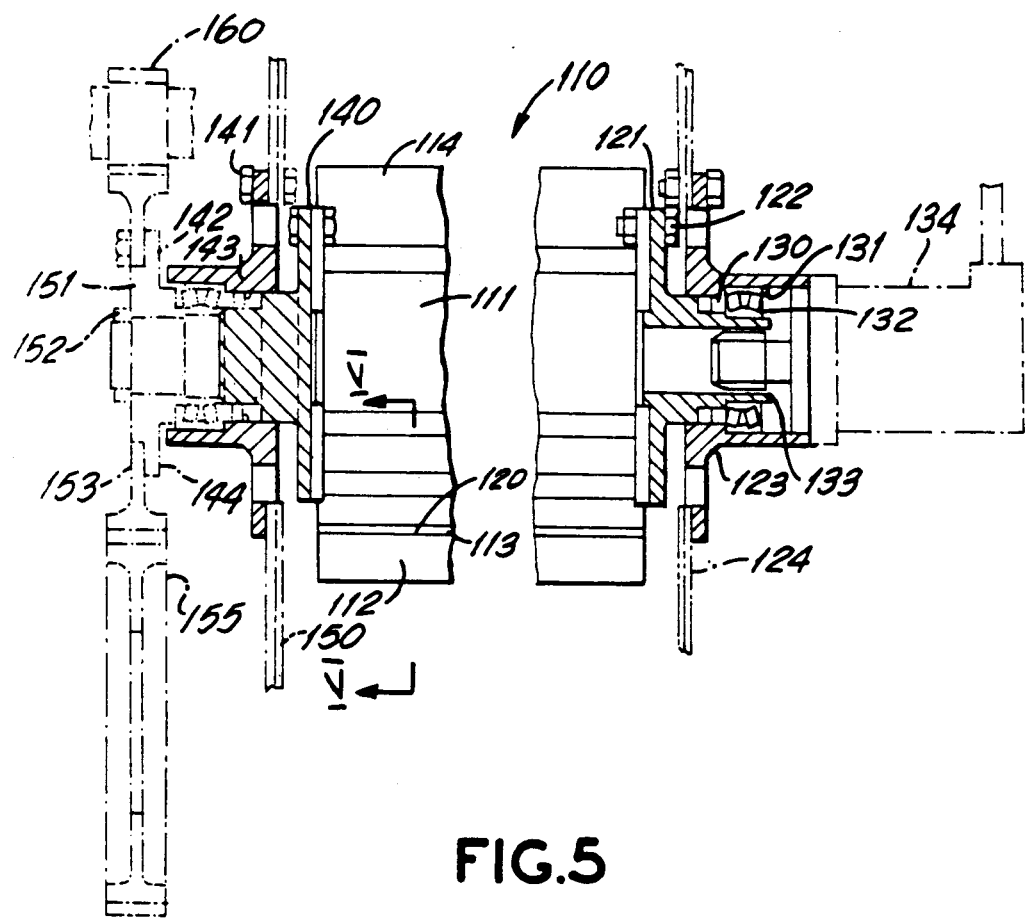
FIG. 5 is a partial sectional view of the chopper roll assembly according to the invention.

A chopper assembly for a cane harvester is generally shown at 110 in FIG. 5 It comprises two chopper drums, 111, 112 (only 111 is shown mounted in the frame sections) with knives 113, 114 mounted at a 180 interval about the periphery of chopper drum 111, and a knife 120 mounted on chopper drum 112. It will be understood that chopper drum 112 is only partially depicted and that a second knife (not shown) is mounted at a 180° oppositely located position on chopper drum 112. Chopper drum 112 is identical in all major respects to chopper drum 111 and will be described only incidentally.

A drive stub 121 is removably connected to chopper drum 111 as indicated with bolts 122 (only one of which is shown) mounted about the periphery of the drive stub 121. Drive stub 121 is mounted within a hub bearing assembly 123 mounted to one frame section 124 of a cane harvester (not shown). A seal 130 and bearing 131 are mounted within a hub bearing assembly 123. Circlips 132 retain the bearing 131 within the hub bearing assembly 123.

Drive stub 121 is internally splined and a splined shaft 133 is connected to hydraulic motor 134 and mounted within the drive stub 121. It will be understood that the mounting of the chopper drum 112 the rightwardly located frame section 124 (as seen in the drawing) is identical to that mounting described with respect to the chopper drum 111.

On the opposite end of chopper drum 111, a splined timing stub 140 is removably connected to chopper drum 111 with bolts 141 (only one of which is shown). Timing stub 140 is, in turn, mounted within a timing hub bearing housing 142 which contains a seal 143 and a bearing 144. Timing hub bearing housing 142 is connected to frame section 150.

Figure 6:
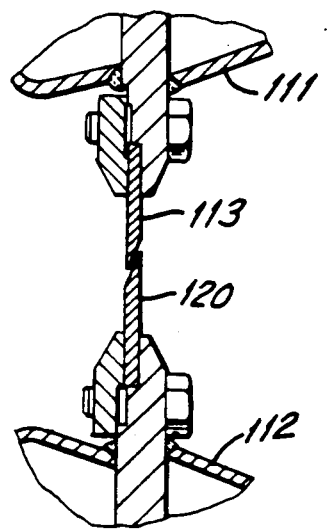
FIG. 6 is a partial sectional view taken along V—V of FIG. 5.

An indexing plate 151 is internally splined and is connected to the complementary spline on timing stub 140. Indexing plate 151 is retained on the shaft of timing stub 140 by nut 152 threadedly mounted on the shaft of timing stub 140. A timing gear 153 is connected to indexing plate 151 with the use of bolts 154 (only one of which is shown). It will be understood that timing gear 153 is connected to a complementary gear 155 (shown in outline) which is mounted to chopper drum 112. By loosening bolts 154, timing gear 153 may be rotated with respect to the indexing plate 151. Thus, the knives of the chopper drums 111, 112 may be indexed in order to select their correct meshing relationship as seen in FIG. 6.

A pinion 160 extends to a flywheel (not shown) from timing gear 153. The flywheel provides necessary inertia to the chopper drums 111, 112 under operating conditions.

Figure 7:
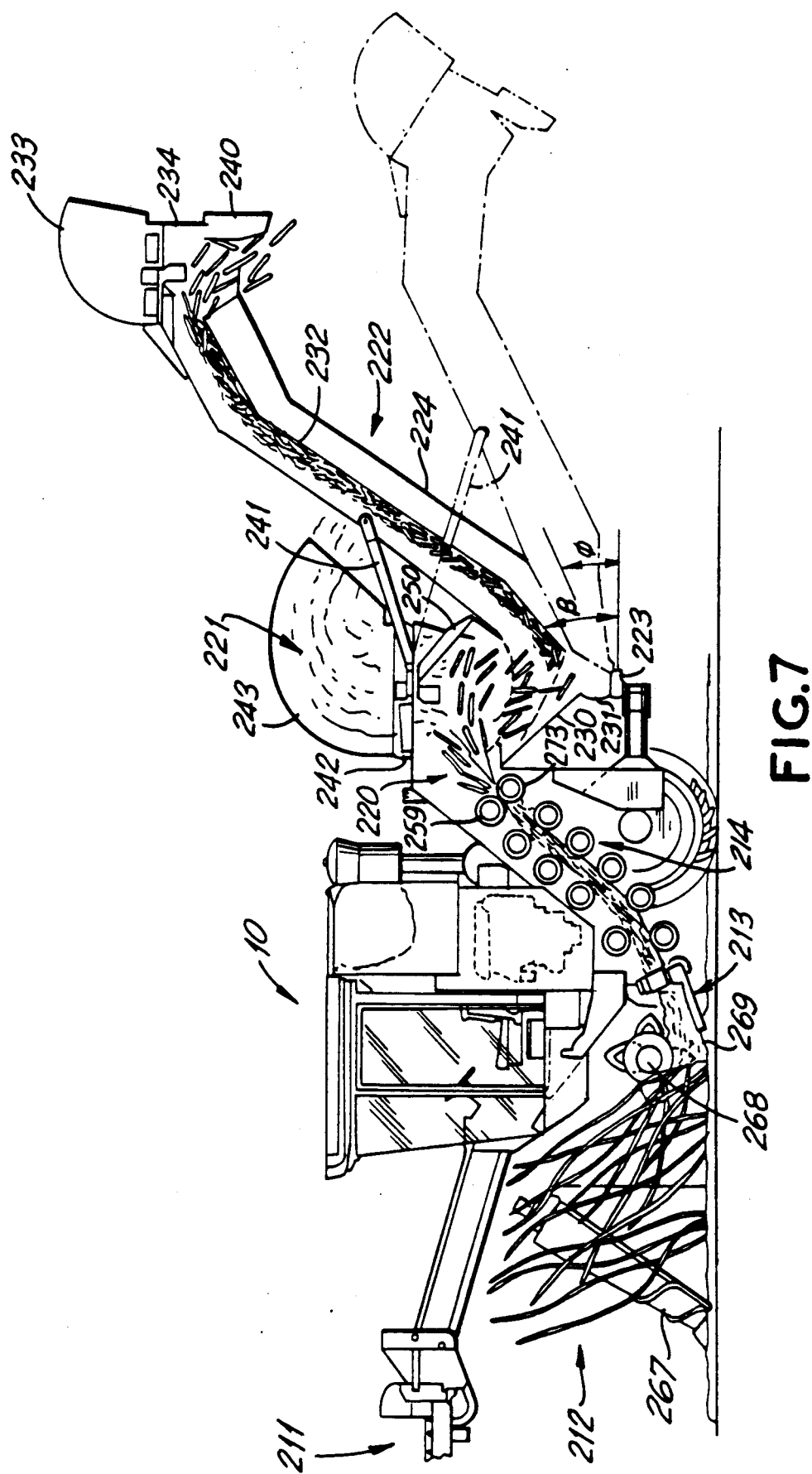
FIG. 7 is a further side view of a cane harvester according to the invention illustrating its elevator in the operating mode and showing the transport mode in outline.

The cane harvester 10 in FIG. 7 comprises a topper assembly generally shown at 211, crop gathering and divider means generally shown at 212, crop cutting means generally shown at 213, crop feed conveying means generally shown at 214, crop severing means generally shown at 220, crop cleaning assembly generally shown at 222.

Figure 8:
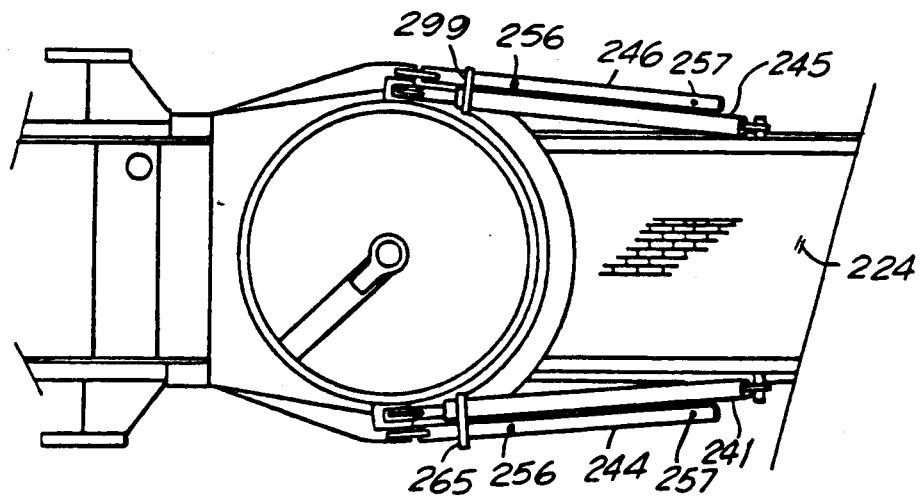
FIG. 8 is a partial plan view of the elevator of FIG. 7 illustrating its position in the operating mode.
Figure 9:
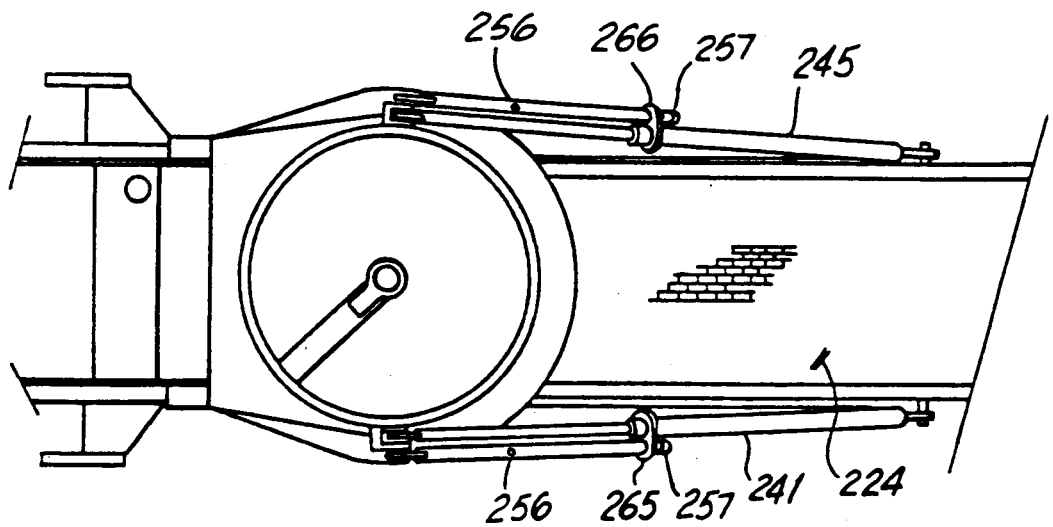
FIG. 9 is a partial plan view of the elevator of FIG. 7 illustrating its position in the transport mode.
Figure 10:
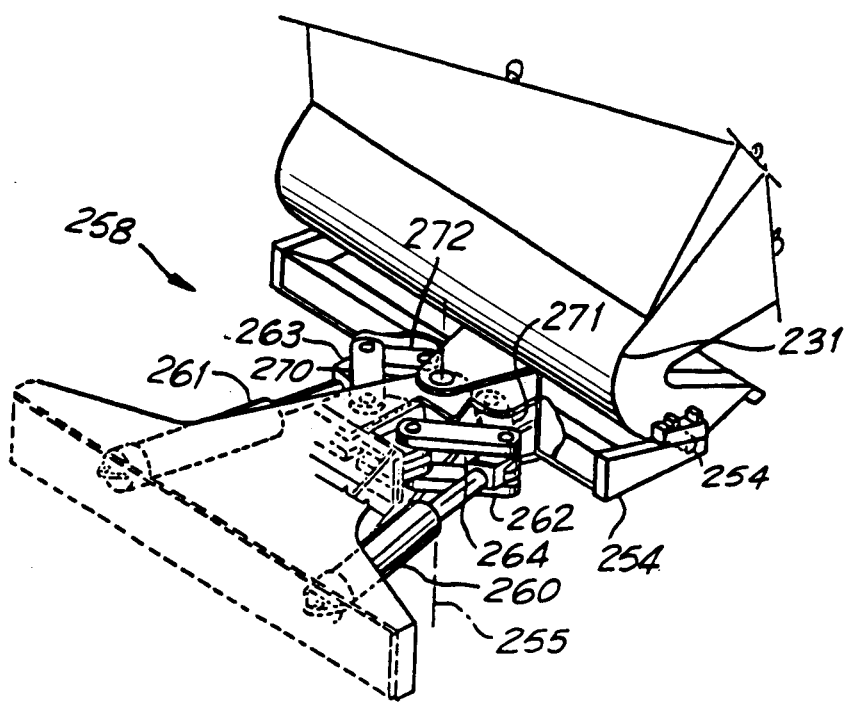
FIG. 10 is a partial isometric view of the elevator support frame extending from the main frame of the cane harvester.

The crop elevator assembly 222 comprises an elevator support structure 223, and elevator 224 with a bowl 230, a boot 231, a flight conveying floor 232, an extractor chute 233, a hood 234 and a bin flap 240. A pair of support arms 241, 245 (FIGS. 8 and 9) in the form of hydraulic cylinders are connected between the slew ring 242 of the extractor hood 243 of the crop cleaning assembly 221 and the elevator assembly 222. Safety rods 244, 246 are positioned adjacent each hydraulic cylinder 241, 245 respectively, safety rods 244, 246 have two operating positions 256, 257 each position being defined by a pin (not shown) extending through the safety rods 244, 246 and position 257 being defined by a stop on the safety rods 244, 246. In the first operating position, 256, as depicted in FIG. 8, the elevator 224 is in the operating mode and in the second operating position 257 with the pin removed from position 256, the elevator 224 will assume its transport mode.

The crop cleaning assembly 221 comprises an extractor hood 243 mounted on the top of the air intake 250. The air intake 250 is annular in form and its lower skirt contains cutouts 252, each cutout 252 being located 180 opposed from a similar cutout on the opposite side of the harvester 10.

The elevator 224 has stub shafts 251 (only one of which is shown) connected thereto and mounted on the outside of the boot 231 of elevator 224. The stub shafts 251 form an axis about which the elevator 224 may be raised or lowered by the hydraulic cylinders 241, 245. Stub shafts 251 fit into a complementary recess on slew bracket 254. Slew bracket 254 is rotatable about axis 255 by an elevator slew mechanism generally shown at 258 consisting of two hydraulic cylinders 260, 261 connected by two clevis' 262, 263 and link arms 264, 270 to second link pairs 271, 272 which are connected to slew bracket 254.

Figure 11:
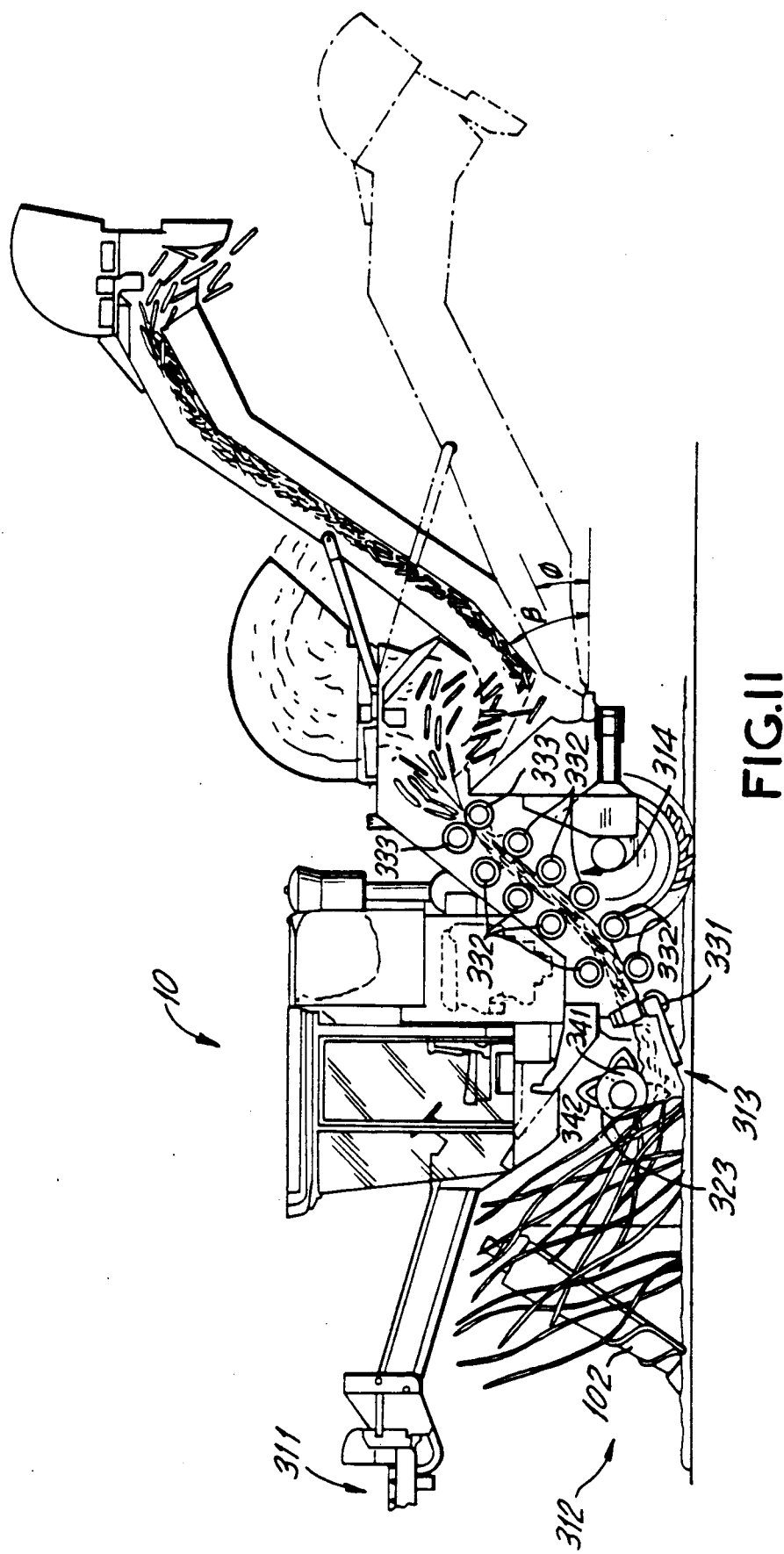
FIG. 11 is a further side view of a cane harvester, according to the invention.

A cane harvester 10 in FIG. 11 comprises a topper assembly generally shown at 311, a crop gathering and dividing area generally shown at 312, a basecutter assembly generally shown at 313, a feeding area generally shown at 314, a cleaning area generally shown at 320 and an elevating and discharge area generally shown at 321.

The throat area of the harvester 10 includes a top roller 323 and the cutter discs 350, 351 of the basecutter assembly 313. A butt roller 331 (more clearly seen in FIG. 12) is mounted immediately behind the cutter discs 350, 351. The feeding gear includes feed rollers 32 which lead to the chopper drums 33.

Figure 13:
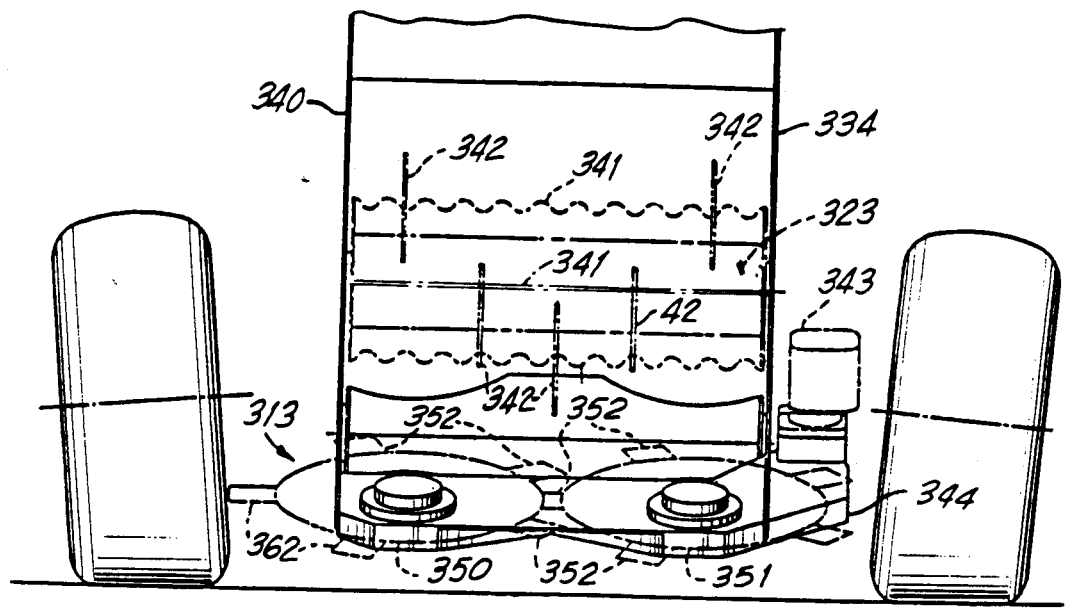
FIG. 13 is a front view of the cane harvester illustrating the throat area of the harvester and the basecutter assembly.

Top roller 323 is mounted within the throat area defined by the inner walls of frame sections 334, 340 as illustrated in FIG. 13. The top roller 323 has four radially extending contact or wear strips 341, each extending outwardly from the top roller 323. A series of fins or combing discs 342 are intermittently mounted across the width of top roller 323 and about its diameter. The fins 342 are mounted symmetrically about the contact strips 341 as best seen in FIG. 11 and have a forward rearward profile, each profile being generated in a convex, radial surface.

The basecutter assembly 313 is mounted at an angle on the frame sections 334, 340 of the cane harvester 10 as seen in FIGS. 11 and 13. The basecutter assembly 313 includes a hydraulic motor 343, a gearbox 344, attached basecutters or cutter discs 350, 351 and a plurality of cutter knives 352 mounted intermittently about the periphery of each of the cutter discs 350, 351.

A butt roller 331 is mounted substantially directly behind the plane of the cutter discs 350, 351. To more nearly be brought into proximity with the rearward edges of the cutter discs 350, 351, of the basecutter assembly 313, the butt roller 331 has a reverse hourglass configuration which confirms to the rearward edges of the periphery of the cutter discs 350, 351 (FIG. 13). An area A, whom cross-hatched in FIG. 12, is an open area between the outside of the arcs described by the periphery of the cutter knives 352 and the butt roller 331.

Figure 12:
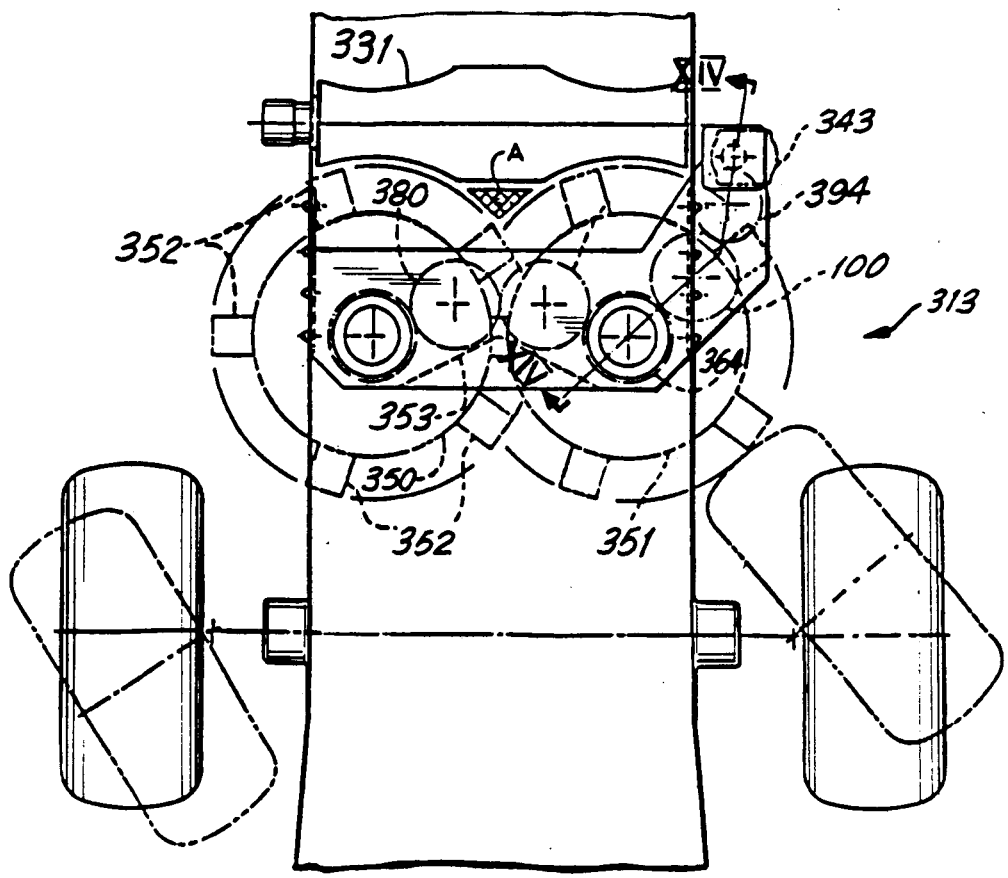
FIG. 12 is a diagrammatic partial plan view of the cutting area of the cane harvester of FIG. 11 depicting the basecutter assembly, the butt roller and the gearbox of the basecutter assembly.

Referring to FIG. 12, the basecutter gearbox 344 has a V-shaped configuration 353 removed from the forward lower area of the gearbox 344 such that the knives 352 of the cutter discs 350, 351 may be brought into closer proximity with the ground at the centrally located cutting area where the cutter knives sever the cane stalks.

Figure 14:
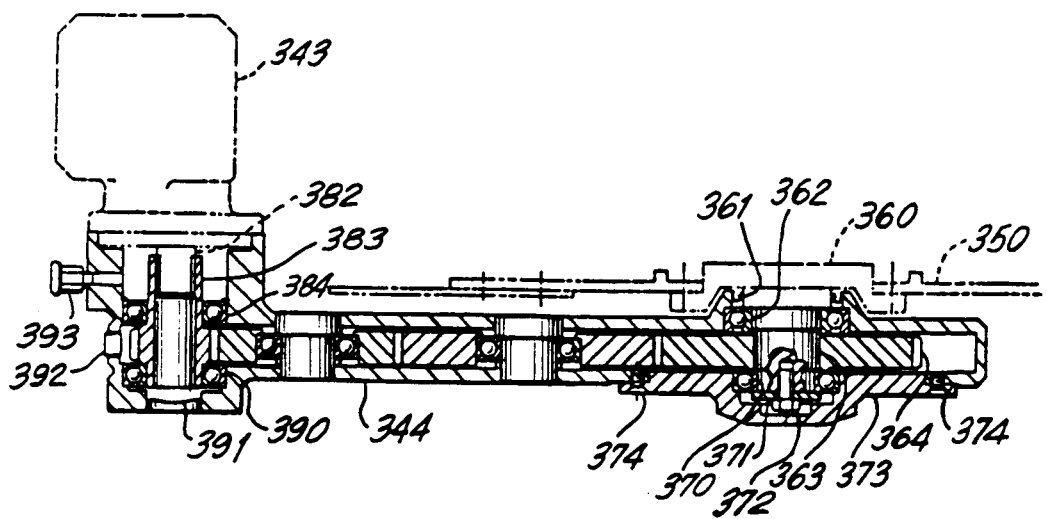
FIG. 14 is an enlarged cutaway view of the basecutter assembly taken along XIV—XIV of FIG. 12.

Referring to FIG. 14, the gearbox 344 of the basecutter assembly 313 has an output coupling 360 connected to the cutter disc 350 mounted on top of the gearbox 344. A seal 361 is provided to seal the bearing 362. The splined shaft 363 extends from output coupling 360. Output gear 364 is mounted on splined shaft 63 and bearings 362, 370 are mounted on stepped portions of splined shaft 363. A retaining washer 371 and a bolt 372 are mounted to splined shaft 363. An output cover 373 is connected to the gearbox 354 by countersunk screws 374.

A second output coupling (not shown) connected to cutter disc 351 is identical to the output coupling 360 as depicted in FIG. 14. The connecting and mounting arrangements are also identical to those shown in connection with output couplings 360. Two idler gears 380, 381 connect the basecutters 350, 351 (FIG. 12) and thereby index the knives 352.

Hydraulic motor 343 is mounted to the gearbox 344 and a shaft 382 extends from the hydraulic motor 343. A splined pinion 383 fits onto shaft 382 and bearings 384, 390 are mounted on the pinion 383 with the gearbox 344. A press plug 391 and a screwed plug 392 are inserted to seal the gearbox 344. A breather 393 is provided to allow the gearbox to exhaust pressure to the atmosphere. Two idler gears 394, 100 are provided to convey the motor torque from pinion 383 to output gear 364.

The basecutter 313 is mounted in the frame of the harvester 10 with the hydraulic motor 343 extending outside the width of the frame sections 334, 340. Appropriate hydraulic controls and couplings are provided (not shown) for the necessary drive and control of the gearbox 344.

OPERATION

In operation, the cane harvester 10 proceeds leftwardly as seen in FIG. 1. As it moves the crop enters the crop dividing and gathering area 11 where it is divided by the crop dividers 82. As seen in FIG. 1, the cane to be harvested is of a significant height and, therefore, a hollow area in the harvester 10 is necessary between the frame sections 22, 23 to allow the cane to pass to the top roller 83 and the basecutting area 13 where it is severed by the basecutters 84, the height of the basecutters 84 above the ground surface being adjustable by utilizing vertical telescopic hydraulic cylinders 81.

Because the hollow area extends upwardly between the frame sections 22, 23 a good distance, the fuel tank 40 and the engine compartment 102 are designed to carry a significant portion of the structural loading on the harvester 10.

As the crop is severed by the basecutters 84, it is lifted by butt roller 90 as depicted in FIG. 2 and passes through the crop feeding area 14 to the chopper drums 55, 56. The crop encountered by the chopper drums 55, 56 may be substantial and its thickness may vary considerably depending on the quality and density of the cane being harvested, and the ground conditions in which the cane harvester 10 is being operated. If the soil is rocky, rocks and other foreign debris may be encountered by the chopper drums 55, 56 all of which contribute to the severe operating conditions. The chopper drums 55, 56 extend transversely between the frame sections 22, 23 and the knives (not shown) of the chopper drums 55, 56 are indexed into close proximity throughout their longitudinal length which extends substantially across the distance between frame sections 22, 23.

After being cut into billets by the chopper drums 55, 56, the billets pass to the cleaning area 20 where trash and other crop debris is blown from the primary extractor hood 91 by primary extractor fan 92. The billets fall into bowl 93 of elevator 94 and are conveyed upwardly by the elevator 94. Trash in the billets is blown from the secondary extractor hood 100 by secondary extractor fan 101. The billets are then dropped from the elevator 94 into a receiving vehicle (not shown).

As illustrated in FIG. 1, the elevator 94 may move upwards and downwards. Additionally, the harvester 10, being an adjacent row type cutting harvester, has the ability of moving the elevator 21 from sided to side depending on what row of cane is being harvested. This capability causes considerable loading on the harvester 10 and the frame sections 22, 23 in the area of the chopper drums 55, 56. A significant portion of this loading is carried by the hydraulic fluid tanks 61, 62 which, as described, extend transversely between the frame sections 22, 23.

It is contemplated that the liquid carrying tank means may be mounted at positions in the harvester 10 other than those explicitly described while the engine compartment 102 may also be mounted at various locations. However, if a liquid carrying tank means or the engine compartment are to be used as individual or collective load carrying members, each one so used will extend between the frame sections 22, 23 and be rigidly mounted thereto.

The hydraulic motors 134 (only one of which is shown) are operated to turn the chopper drums 111, 112 with the knives 113, 120 coacting in the correct operating relationship as determined by indexing plate 151 and timing gear 153. As the chopper drums 111, 112 rotate, the flywheel (not shown) is driven by the flywheel pinion 160. The rotational inertia provided to the chopper drums 111, 112 by the flywheel smoothes the rotation of the chopper drums 111, 112 and provides a more uniform amount of energy to the chopper drums 111, 112 under various crop conditions.

In the event of damage to the chopper drum 111, the bolts 122 connecting the chopper drum 111 to the drive stub 121 are removed and the bolts 141 connecting the timing stub 140 to the chopper drum 111 are similarly removed. The chopper drum 111 can then be removed from the frame sections 124, 150 without the necessity of removing the drive stub 121, hub bearing housing 123, timing stub 140, timing hub bearing housing 142 and hydraulic motor 134. More importantly, damaged elements on the chopper drum 111 may be repaired without the necessity of replacing the relatively expensive splined drive and timing stubs 121, 140.

As the cane harvester 10 proceeds leftwardly as viewed in FIG. 7, cane is divided by the crop dividers 267 (only one of which is shown) and passes to the cutting area 213 where it is knocked down and separated by top roller 268 and severed by basecutter 269. The cane passes through the feed area 214 to the chopper drums 259, 273 where it is severed into billets which pass through the cleaning area 221 and into the bowl 230 of the elevator 224. The flights in elevator 224 move the billets upwardly to the hood 234 where they are dropped into a transport vehicle (not shown). The elevator 224 may be operated on either side of the harvester 10 by operating the hydraulic cylinders 260, 261 of the slew mechanism 258.

While the machine is in operation, the hydraulic cylinders 241, 245 will be operating with the pin in its first operating position 256. This will prevent the elevator 224 from being inadvertently lowered during operation.

When servicing of the elevator 224 is required or when the transport mode is necessary as, for example, when the harvester is being carried on a flatbed and must pass within height restrictions, the pin is removed from the operating positions 256 in safety rods 244, 256 while the elevator 224 extends directly rearwardly on the harvester 10. With the pin removed, the guide plates 265, 266 allow the elevator 224 to be shown in FIG. 9. In this position, the upper edge of the bowl 230 of elevator 224 will be within the cutout 252 of the air intake 250 of the crop cleaning assembly.

Thus, the elevator 224 assumes the position shown in outline in FIG. 7 and servicing of the elevator 224 and transport of the harvester 10 are possible without the necessity for climbing the elevator 224 or removing it.

As cane is gathered into the crop gathering and dividing area 312 by the spiral feed rollers 302 (only one of which is shown), the topper assembly 311 severs the top of the cane containing the leaves and disposes of it to one side of the harvester 10 away from the adjacent row to be cut. Top roller 323 knocks the upstanding cane stalks forwardly and the fins 342 separate the cane stalks. The cane stalks pass to the cutter discs 350, 351 of basecutter 330 as seen in FIG. 12 and are severed by knives 352. The cane stalks pass over the cutter discs 350, 351 and are lifted vertically into the feed passage between the feed rollers 332 by butt roller 331. The cane is carried rearwardly through the feed passage to the choppers 333, the cleaning area 320 and the conveying and discharge area 321 but a description of these areas is not germane to the present invention.

During the passage of the cane through the basecutter 313, the action of the fins or combing discs 342 on the top roller 323 is of interest. In green cane, the top roller 323 is exposed to the full complement of crop material and, occasionally, the top roller 323 may become fouled with leafy material. A common technique to remove or expedite the removal of leafy material is by reversing the direction of rotation of the top roller 323. Because the profile of the fins or combing discs 342 is symmetrical about the wear strips 341, the crop material will not be bound to the top roller 323 more tightly when the rotation of the top roller 323 is reversed but rather, the material will be loosened which will expedite its removal from the top roller 323.

While specific embodiments of the invention have been described, they should be construed as illustrative only and not as limiting the scope for the invention as defined in the accompanying claims.

What is claimed is:

1. In a sugar cane harvester which includes a frame, means coupled to the frame for severing cane stalks from the ground and for chopping such stalks into billets and conveying such billets to a cleaning chamber for separating trash therefrom, and an elevator for conveying such billets from the cleaning chamber for dropping them into a storage container, an improved elevator position control mechanism, comprising:

means for pivoting said elevator about a first vertical axis located below said cleaning chamber, including:

a bracket pivotally mounted to said frame for rotation about said first vertical axis, said elevator being mounted to said bracket;

a pair of slew control arms each including two links, said links of each pair being pivotally joined to one another proximate one end thereof to form an elbow joint rotatable about a second vertical axis;

means pivotally coupling one of the links of each pair proximate the other end thereof to said frame for rotation about said second vertical axis;

means pivotally coupling the other link of each pair proximate the other end thereof to said bracket on either side of the pivotal mounting of said bracket to said frame; and means coupled between positions on said frame or on the bracket and said elbows for selectively exerting push-pull forces on said arms for slewing said elevator about said first vertical axis to either side of the harvester.

2. The improved elevator position control mechanism of claim 1 further including:

means for raising and lowering said elevator including:

means pivotally coupling said elevator to said bracket for rotation about a horizontal axis; and hydraulic means for controlling the vertical position of said elevator about said horizontal axis.

3. The improved elevator position control mechanism of claim 2 further including a pair of support arms for controlling the vertical position of said elevator about said horizontal axis, one each of said pair of support arms being disposed on either side of the pivotal mounting of said bracket to said frame.

* * * * *